(12) United States Patent
Adachi

(10) Patent No.: US 11,482,715 B2
(45) Date of Patent: Oct. 25, 2022

(54) MANUFACTURING METHOD OF FUEL-CELL SINGLE CELL

(71) Applicant: TOYOTA JIDOSHA KABUSHIKI KAISHA, Toyota (JP)

(72) Inventor: Makoto Adachi, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 261 days.

(21) Appl. No.: 16/899,478

(22) Filed: Jun. 11, 2020

(65) Prior Publication Data

US 2021/0075033 A1 Mar. 11, 2021

(30) Foreign Application Priority Data

Sep. 10, 2019 (JP) .............................. JP2019-164580

(51) Int. Cl.
*H01M 8/0286* (2016.01)
*H01M 8/0284* (2016.01)
*H01M 8/0273* (2016.01)
*H01M 8/1004* (2016.01)
*H01M 8/12* (2016.01)

(52) U.S. Cl.
CPC ....... *H01M 8/0286* (2013.01); *H01M 8/0273* (2013.01); *H01M 8/0284* (2013.01); *H01M 8/1004* (2013.01); *H01M 2008/1293* (2013.01)

(58) Field of Classification Search
None
See application file for complete search history.

(56) References Cited

U.S. PATENT DOCUMENTS

| | | | |
|---|---|---|---|
| 2014/0011111 A1* | 1/2014 | Mitsuta | H01M 8/1007 429/481 |
| 2020/0091533 A1* | 3/2020 | Joye | H01M 8/0286 |
| 2020/0287231 A1* | 9/2020 | Inoue | H01M 8/0239 |

FOREIGN PATENT DOCUMENTS

| | | |
|---|---|---|
| JP | 2016-162650 A | 9/2016 |
| JP | 2017-182894 A | 10/2017 |

\* cited by examiner

*Primary Examiner* — Alix E Eggerding
(74) *Attorney, Agent, or Firm* — Hunton Andrews Kurth LLP

(57) ABSTRACT

Provided is a manufacturing method of a fuel-cell single cell including a membrane-electrode assembly, an anode gas diffusion layer, a cathode gas diffusion layer, and a frame-shaped resin frame to which a peripheral edge portion of the membrane-electrode assembly is fixed. The method includes an adhesive application step of applying an adhesive by screen printing to a predetermined area of the resin frame while fixing the resin frame by suction, and a stacking step and a UV irradiation step of bonding together the resin frame to which the adhesive has been applied and the membrane-electrode assembly by the adhesive.

2 Claims, 6 Drawing Sheets

MANUFACTURING METHOD OF FUEL-CELL SINGLE CELL

INCORPORATION BY REFERENCE

The disclosure of Japanese Patent Application No. 2019-164580 filed on Sep. 10, 2019 including the specification, drawings and abstract is incorporated herein by reference in its entirety.

BACKGROUND

1. Technical Field

The present disclosure relates to a manufacturing method of a fuel-cell single cell including a membrane-electrode assembly and a frame-shaped resin frame to which a peripheral edge portion of the membrane-electrode assembly is fixed.

2. Description of Related Art

A fuel cell has a fuel cell stack that is a stack of a plurality of fuel-cell single cells. Each fuel-cell single cell is composed of a membrane-electrode assembly (MEA), gas diffusion layers disposed one on each surface of the MEA, a frame-shaped resin frame to which a peripheral edge portion of the MEA is fixed, and a pair of separators that sandwiches the MEA, the gas diffusion layers, and the resin frame from both sides.

There is a known manufacturing method of such a fuel-cell single cell that involves providing a gas diffusion layer on a lower surface of an MEA, applying an adhesive to a predetermined area of an upper surface of the MEA by screen printing, and bonding together the MEA to which the adhesive has been applied and a resin frame by the adhesive (e.g., see Japanese Patent Application Publication No. 2016-162650). When performing screen printing on the upper surface of the MEA, a common practice is to fix the gas diffusion layer provided on the lower surface of the MEA by suction.

SUMMARY

In the case where an adhesive is applied to an MEA by screen printing, the adhesive contains a solvent (organic solvent) that gives the adhesive predetermined viscosity. This solvent is evaporated by heat during manufacturing of the fuel-cell single cell, thereby poisoning the catalyst and degrading the performance of the fuel cell. It is therefore desirable to reduce the solvent content in the adhesive, but reducing the solvent content increases the viscosity of the adhesive.

Here, gas diffusion layers have a porous structure, which makes it difficult to firmly fix a gas diffusion layer and an MEA by suctioning the gas diffusion layer during screen printing. Thus, the problem is that if an adhesive having a lower solvent content and hence higher viscosity is applied to an MEA by screen printing, the MEA will stick to a screen printing plate due to the viscosity of the adhesive (i.e., the MEA will be lifted off the fixing base (also called a surface plate)).

The present disclosure has been contrived in view of this problem, and an object thereof is to provide a manufacturing method of a fuel-cell single cell by which a fuel-cell single cell can be easily manufactured even when a high-viscosity adhesive is used.

A manufacturing method of a fuel-cell single cell according to the present disclosure is a manufacturing method of a fuel-cell single cell including a membrane-electrode assembly, gas diffusion layers disposed one on each surface of the membrane-electrode assembly, and a frame-shaped resin frame to which a peripheral edge portion of the membrane-electrode assembly is fixed. The method includes a first step of applying an adhesive by screen printing to a predetermined area of the resin frame while fixing the resin frame by suction, and a second step of bonding together by the adhesive the resin frame to which the adhesive has been applied and the membrane-electrode assembly that has the gas diffusion layer provided at least on a surface opposite from a surface to which the resin frame is to be bonded.

The manufacturing method of a fuel-cell single cell of the present disclosure includes the first step of applying the adhesive by screen printing to a predetermined area of the resin frame while fixing the resin frame by suction. Thus, the object to be suctioned (resin frame) can be firmly fixed, unlike when the gas diffusion layer provided on the membrane-electrode assembly and having a porous structure is suctioned. Therefore, even when an adhesive having a lower solvent content and hence higher viscosity is used, the object to be suctioned (resin frame) is less likely to stick to the screen printing plate, and a fuel-cell single cell can be easily manufactured.

Since the solvent content in the adhesive can be reduced, the likelihood that the solvent may poison the catalyst by being evaporated by heat during manufacturing of the fuel-cell single cell can be reduced. As a result, the solvent contained in the adhesive is less likely to degrade the performance of the fuel cell.

In the above manufacturing method of a fuel-cell single cell, the resin frame may have an opening bored through the resin frame in a thickness direction at a part surrounded by an area to which the adhesive is applied. In the second step, the resin frame and the membrane-electrode assembly may be bonded together while the resin frame and the membrane-electrode assembly are moved back and forth relatively to each other in planar directions orthogonal to the thickness direction such that the adhesive spreads into the opening. Thus bonding together the resin frame and the membrane-electrode assembly while moving the resin frame and the membrane-electrode assembly back and forth relatively to each other in planar directions can easily spread the adhesive into the opening.

Moreover, spreading the adhesive into the opening can reduce the likelihood that an electrode of the membrane-electrode assembly may be exposed inside the opening.

In the above manufacturing method of a fuel-cell single cell, the resin frame may have an opening bored through the resin frame in a thickness direction at a part surrounded by an area to which the adhesive is applied. In the first step, the adhesive may be applied by screen printing in a state where the resin frame is fixed by a fixing base having a suction surface to which the resin frame is fixed by suction and a protrusion that protrudes from the suction surface into the opening. This configuration can reduce the likelihood that the screen printing plate may be pressed into the opening during screen printing on the resin frame, so that the adhesive is less likely to be unevenly applied.

The present disclosure can provide a manufacturing method of a fuel-cell single cell by which a fuel-cell single cell can be easily manufactured even when a high-viscosity adhesive is used.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
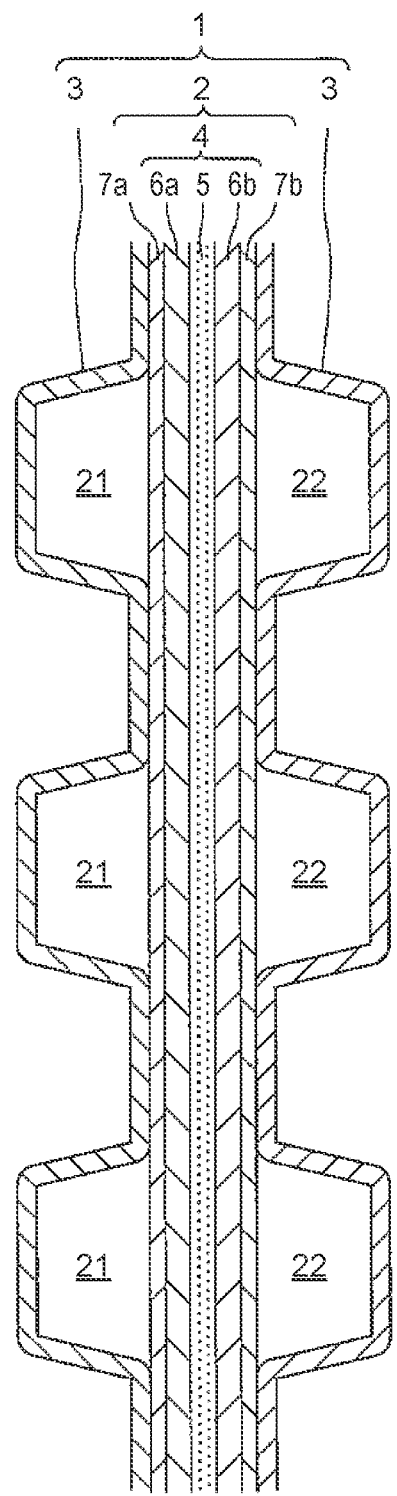
FIG. 1 is a view of a main part of a fuel-cell single cell manufactured by a manufacturing method according to an embodiment of the present disclosure, as seen in cross-section.

The configuration of the present disclosure will be described in detail below based on an example of embodiments shown in the drawings. The following description illustrates a case where the present disclosure is applied to a fuel cell installed in a fuel cell vehicle or a fuel cell system including this fuel cell, but the scope of application is not limited to this example.

Configuration of Fuel-Cell Single Cell Including Separators

FIG. 1 is a view of a main part of a fuel-cell single cell 1 (hereinafter referred to as a single cell 1) as seen in cross-section. As shown in FIG. 1, the single cell 1 is a polymer electrolyte fuel cell that generates electromotive force by electrochemical reactions between an oxidant gas (e.g., air) and a fuel gas (e.g., hydrogen). The single cell 1 includes a membrane-electrode-and-gas-diffusion-layer assembly (MEGA) 2, and separators (fuel cell separators) 3 that come into contact with the MEGA 2 so as to demarcate the MEGA 2. In this embodiment, the MEGA 2 is sandwiched between the pair of separators 3.

The MEGA 2 is formed by integrating a membrane-electrode assembly (MEA) 4 and an anode gas diffusion layer 7a and a cathode gas diffusion layer 7b disposed one on each surface of the MEA 4. The MEA 4 is composed of an electrolyte membrane 5 and a pair of anode electrode 6a and cathode electrode 6b joined together so as to sandwich the electrolyte membrane 5. The electrolyte membrane 5 is formed by a proton-conducting ion exchange membrane made of a solid polymer material, and the anode electrode 6a and the cathode electrode 6b are, for example, porous layers in which a carbon material or the like supporting a catalyst, such as platinum, is dispersed. The anode gas diffusion layer 7a and the cathode gas diffusion layer 7b have a porous structure, and are formed, for example, by a carbon porous body, such as carbon paper or carbon cloth, or by a gas-permeable, electrically conductive member like a metal porous body, such as a metal mesh or a foam metal.

In this embodiment, the MEGA 2 is a power generating part of the single cell 1, and the separators 3 making a pair are respectively in contact with the anode gas diffusion layer 7a and the cathode gas diffusion layer 7b of the MEGA 2.

The separator 3 is a plate-shaped member made of, as a base material, a metal excellent in electrical conductivity, gas impermeability, etc. (e.g., a metal such as stainless steel, titanium, aluminum, or nickel), and one surface of the separator 3 is in contact with the anode gas diffusion layer 7a or the cathode gas diffusion layer 7b of the MEGA 2.

In this embodiment, each separator 3 has a wavy or indented cross-sectional shape. Each separator 3 is shaped such that each wave has an isosceles trapezoidal shape with a top portion of the wave being flat and corners at both ends of the top portion having an equal angle. Thus, the shape of each separator 3 looks roughly the same from a front side and a back side. The top portions of one separator 3 are in surface contact with the anode gas diffusion layer 7a of the MEGA 2, and the top portions of the other separator 3 are in surface contact with the cathode gas diffusion layer 7b of the MEGA 2.

The separator 3 is molded (undergoes plastic deformation) into the above-described shape by press-molding a sheet-shaped base material 3a that is the aforementioned metal (e.g., a metal such as stainless steel, titanium, aluminum, or nickel) using a die.

Gas flow passages 21 defined between the anode gas diffusion layer 7a and the separator 3 are flow passages through which the fuel gas flows, and gas flow passages 22 defined between the cathode gas diffusion layer 7b and the separator 3 are flow passages through which the oxidant gas flows. When the fuel gas is supplied to the gas flow passages 21 on one side of the single cell 1 and the oxidant gas is supplied to the gas flow passages 22 facing the gas flow passages 21, electrochemical reactions occur inside the single cell 1 to generate electromotive force.

Figure 2:
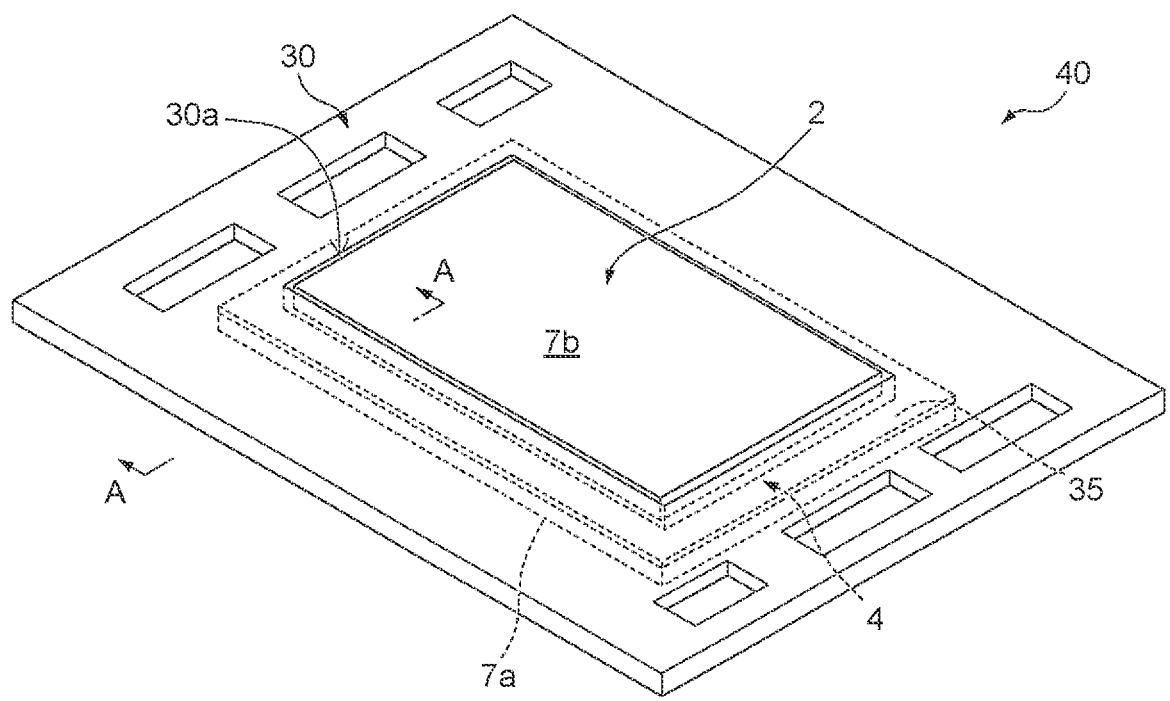
FIG. 2 is a perspective view showing the structure of a membrane-electrode-assembly unit constituting a part of the fuel-cell single cell shown in FIG. 1.
Figure 3:
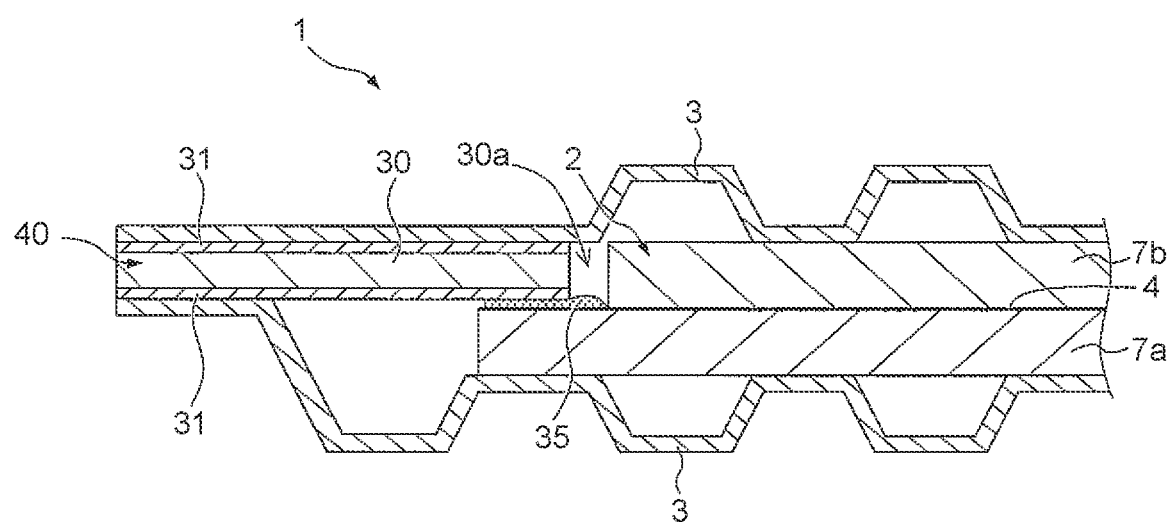
FIG. 3 is a sectional view taken along line A-A of FIG. 2.

As shown in FIG. 2, the MEGA 2 has a rectangular shape as seen in a plan view, and a peripheral edge portion of the MEGA 2 is bonded and fixed to a frame-shaped resin frame 30 through an adhesive layer 35 (see FIG. 3). The MEGA 2 and the resin frame 30 form an MEA unit 40.

The resin frame 30 is a member that seals the fuel gas, the oxidant gas, and a coolant to be described later that flow along the separators 3. The resin frame 30 is made of a thermoplastic resin or a thermosetting resin and has flexibility. Both surfaces of the resin frame 30 are flat and highly smooth. As shown in FIG. 3, the resin frame 30 includes bonding layers 31 that are formed by thermoplastic resin sheets to be joined to the separators 3 by thermo compression bonding and that are disposed one on each surface of the resin frame 30. The single cell 1 is formed as the separators 3 are bonded and fixed to the resin frame 30 of the MEA unit 40. The resin used for the bonding layers 31 is, for example, a polyolefin resin, such as polypropylene, but other resin may also be used.

The resin frame 30 has an opening 30a that is bored through the resin frame 30 in a thickness direction at a central part (a part surrounded by an area to which an adhesive 35a to be described later is applied (a formation area of the adhesive layer 35)). The adhesive layer 35 is formed so as to protrude into the opening 30a of the resin frame 30. The adhesive layer 35 is in contact with a peripheral edge portion of the cathode gas diffusion layer 7b, and is formed such that the MEA 4 is not exposed between an inner peripheral surface of the opening 30a of the resin frame 30 and an outer peripheral surface of the cathode gas diffusion layer 7b. The adhesive layer 35 is formed by a UV-curing adhesive.

The size and shape of the anode gas diffusion layer 7a as seen in a plan view are substantially the same as those of the MEA 4. The cathode gas diffusion layer 7b is smaller than the anode gas diffusion layer 7a. As will be described later, the resin frame 30 is bonded and fixed to a peripheral edge portion of the MEA 4 (on an outer side of the cathode gas diffusion layer 7b).

Configuration of Fuel Cell Stack

Figure 4:
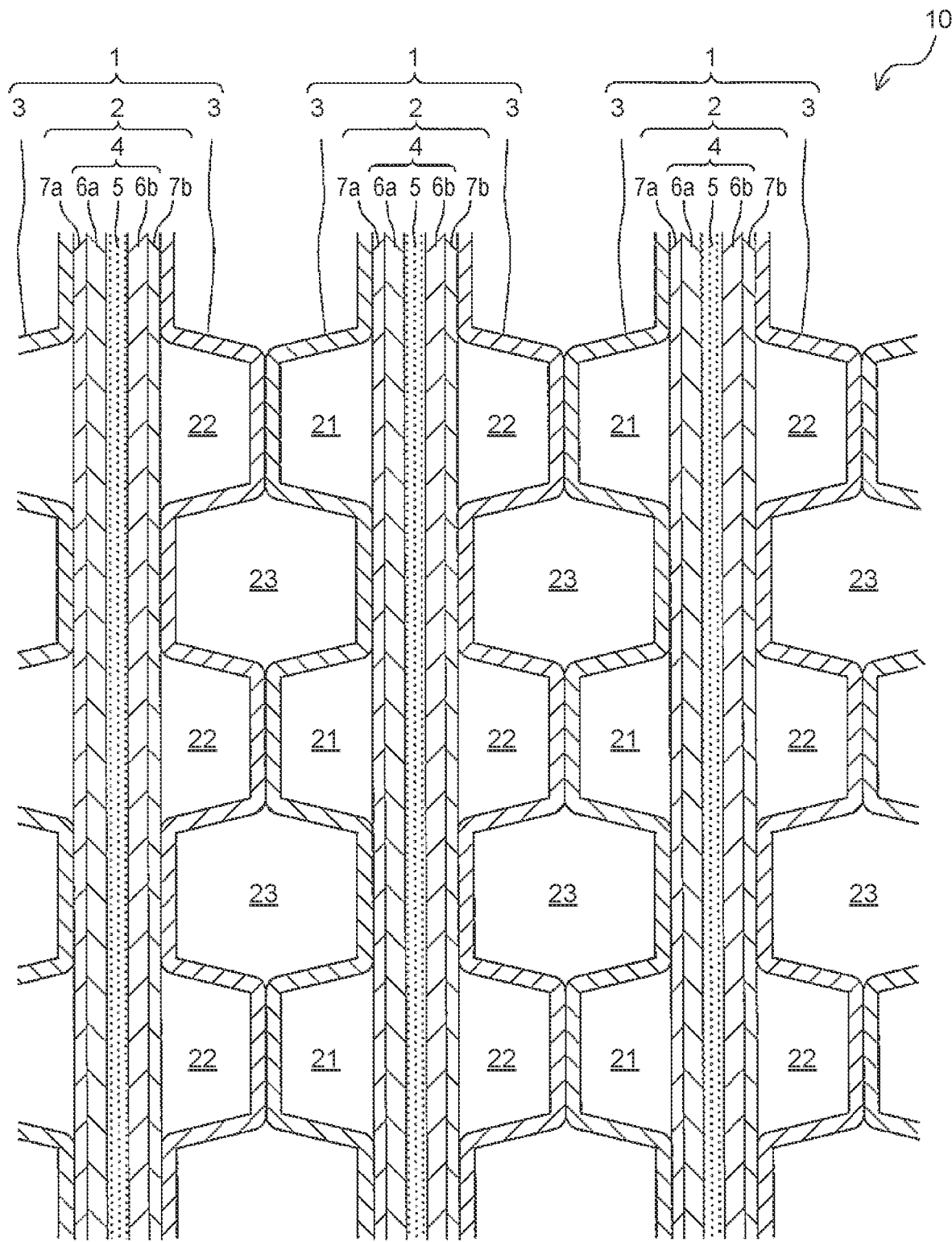
FIG. 4 is a view of a main part of a fuel cell stack produced by stacking a plurality of fuel-cell single cells of FIG. 1, as seen in cross-section.

FIG. 4 is a view of a main part of a fuel cell stack (fuel cell) 10 as seen in cross-section. As shown in FIG. 4, the fuel cell stack 10 is a stack of a plurality of single cells 1 that are basic units. As described above, one surface of each separator 3 of each single cell 1 is in contact with the anode gas diffusion layer 7a or the cathode gas diffusion layer 7b of the MEGA 2 while the other surface is in contact with the other surface of an adjacent other separator 3.

One single cell 1 and an adjacent single cell 1 are disposed with the anode electrode 6a and the cathode electrode 6b facing each other. The top portions on a back surface side of the separator 3 disposed along the anode electrode 6a of one single cell 1 and the top portions on a back surface side of the separator 3 disposed along the cathode electrode 6b of another single cell 1 are in surface contact with each other. Water (the coolant) as a cooling medium for cooling the single cell 1 flows through spaces 23 defined between the separators 3 that are in surface contact with each other between two adjacent single cells 1.

Manufacturing Method of Fuel-Cell Single Cell

Figure 5:
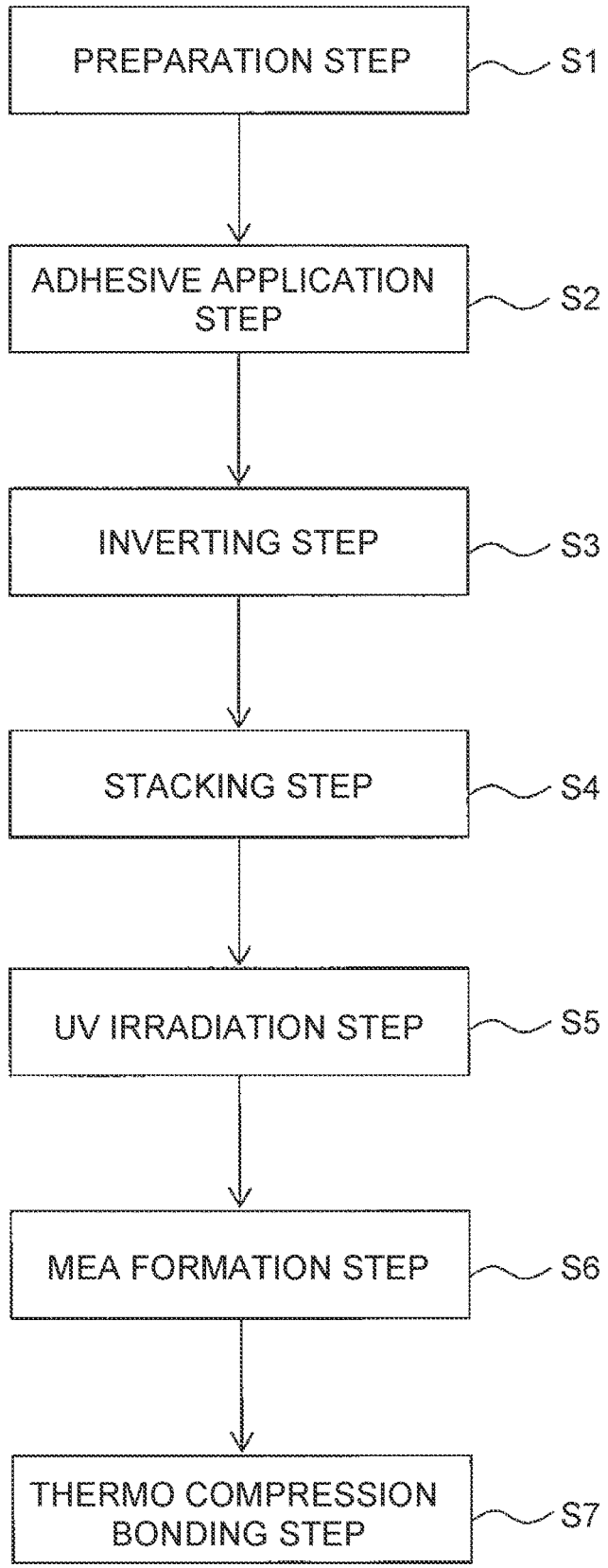
FIG. 5 is a flowchart showing a single cell manufacturing method according to the embodiment of the present disclosure.

Next, a manufacturing method of the single cell 1 according to the embodiment of the present disclosure will be described. FIG. 5 is a flowchart showing the manufacturing method of the single cell 1. As shown in FIG. 5, the manufacturing method of the single cell 1 includes a preparation step S1, an adhesive application step S2, an inverting step S3, a stacking step S4, a UV irradiation step S5, an MEA formation step S6, and a thermo compression bonding step S7. In the following description, the MEA 4 in a state of having the anode gas diffusion layer 7a joined to one side and not having the cathode gas diffusion layer 7b joined to the other side will be referred to as an AnMEGA 2' (see FIG. 7).

In the preparation step S1, the resin frame 30 having the bonding layers 31 provided on both surfaces, and the AnMEGA 2' that is the MEA 4 in the state of having the anode gas diffusion layer 7a joined to one side (on the anode electrode 6a) and having the other side (cathode electrode 6b) exposed are prepared.

Figure 6:
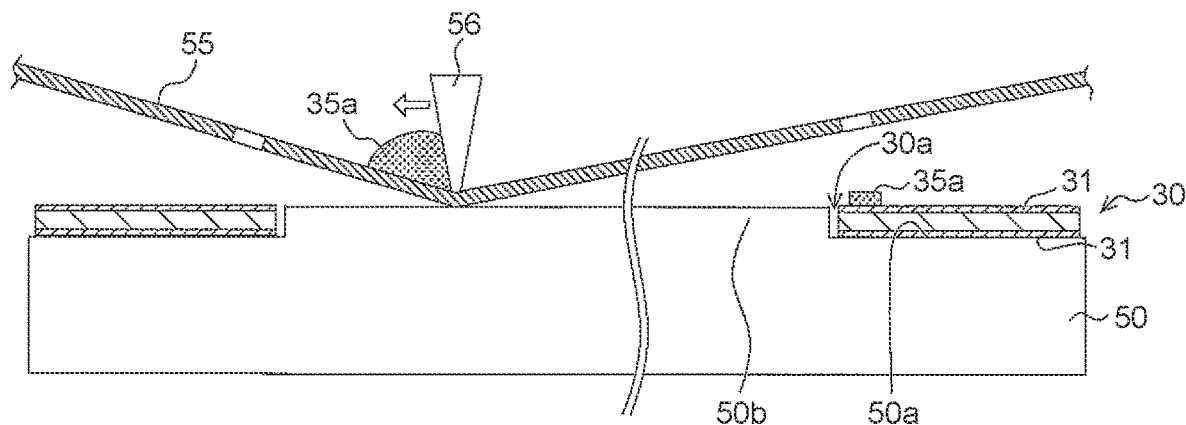
FIG. 6 is a view showing how an adhesive application step of the single cell manufacturing method according to the embodiment of the present disclosure is performed.

Here, in this embodiment, the adhesive 35a to form the adhesive layer 35 is applied to the resin frame 30 and not to the MEA 4 in the adhesive application step S2. Specifically, as shown in FIG. 6, the resin frame 30 is placed on a fixing base 50. The fixing base 50 is a base that fixes the resin frame 30 by suction, and has a suction surface 50a on which the resin frame 30 is placed and to which the resin frame 30 is fixed by suction, and a protrusion 50b that protrudes from the suction surface 50a into the opening 30a of the resin frame 30. A large number of suction holes (not shown) for suctioning the resin frame 30 are formed in the suction surface 50a. The suction holes lead to a suction device (not shown), and the resin frame 30 is suctioned and fixed to the fixing base 50 as the suction device is driven. The outer shape of the protrusion 50b is slightly smaller than that of the opening 30a of the resin frame 30. The extent of protrusion of the protrusion 50b from the suction surface 50a is substantially equal to the thickness of the resin frame 30. Thus, an upper surface of the protrusion 50b is disposed substantially flush with an upper surface of the resin frame 30 (the surface to which the adhesive 35a is applied).

The adhesive 35a in paste form is applied to the predetermined area of the resin frame 30 by using a screen printing plate 55 and a squeegee 56. The adhesive 35a is applied along edges of the opening 30a. The adhesive application step S2 is an example of the "first step" of the present disclosure.

Figure 7:
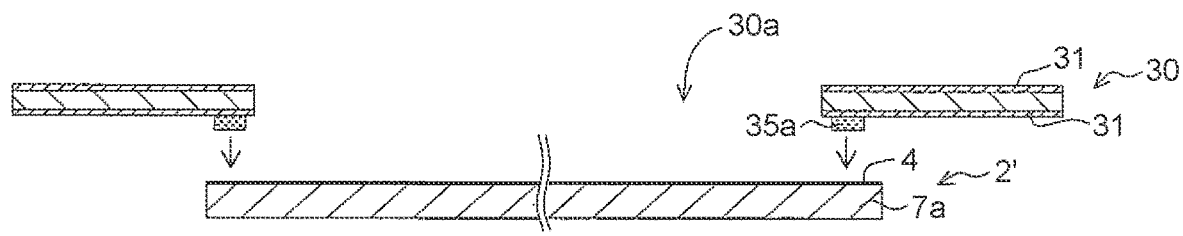
FIG. 7 is a view showing a state where a resin frame is turned upside down in an inverting step of the single cell manufacturing method according to the embodiment of the present disclosure.

In the inverting step S3, the resin frame 30 is turned upside down as shown in FIG. 7. Thus, the resin frame 30 has the adhesive 35a adhering to a lower surface thereof.

Figure 8:
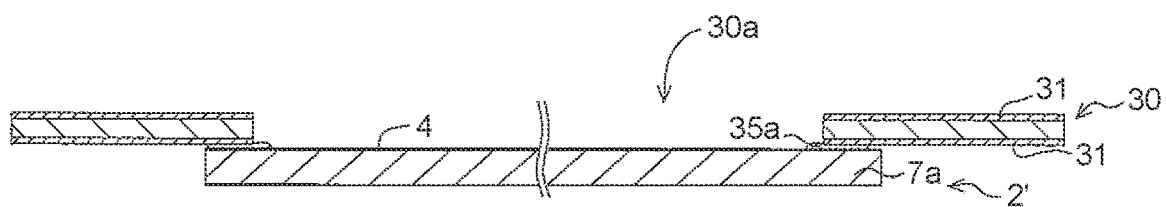
FIG. 8 is a view showing how a stacking step of the single cell manufacturing method according to the embodiment of the present disclosure is performed.

In the stacking step S4, as shown in FIG. 8, the resin frame 30 is pressed from above against the AnMEGA 2' in which the anode gas diffusion layer 7a is disposed on a lower side. Thus, air bubbles that have entered between the resin frame 30 and the adhesive 35a in the adhesive application step S2 are discharged. In this step, the resin frame 30 is pressed against the AnMEGA 2' through the adhesive 35a while being moved back and forth in each of a long-side direction and a short-side direction of the resin frame 30. Specifically, the resin frame 30 is pressed against the MEA 4 while being moved back and forth in planar directions (horizontal directions) orthogonal to a thickness direction of the MEA 4. Here, the resin frame 30 is pressed against the AnMEGA 2' through the adhesive 35a while being moved in circles as seen in a plan view. As a result, the adhesive 35a is spread in the planar directions of the resin frame 30 and the adhesive 35a is formed so as to protrude into the opening 30a of the resin frame 30.

Further, in this step, the resin frame 30 is moved back and forth in each of the long-side direction and the short-side direction of the resin frame 30 such that the extent to which the adhesive 35a spreads into the opening 30a becomes equal to or larger than a gap between the inner peripheral surface of the opening 30a and the outer peripheral surface of the cathode gas diffusion layer 7b to be disposed in a later step (MEA formation step S6). In other words, the resin frame 30 is moved back and forth in each of the long-side direction and the short-side direction of the resin frame 30 so as to spread the adhesive 35a until reaching an area where the cathode gas diffusion layer 7b is to be disposed. As a result, as described above, the adhesive layer 35 comes into contact with the peripheral edge portion of the cathode gas diffusion layer 7b, and the MEA 4 is not exposed between the inner peripheral surface of the opening 30a of the resin frame 30 and the outer peripheral surface of the cathode gas diffusion layer 7b.

Figure 9:
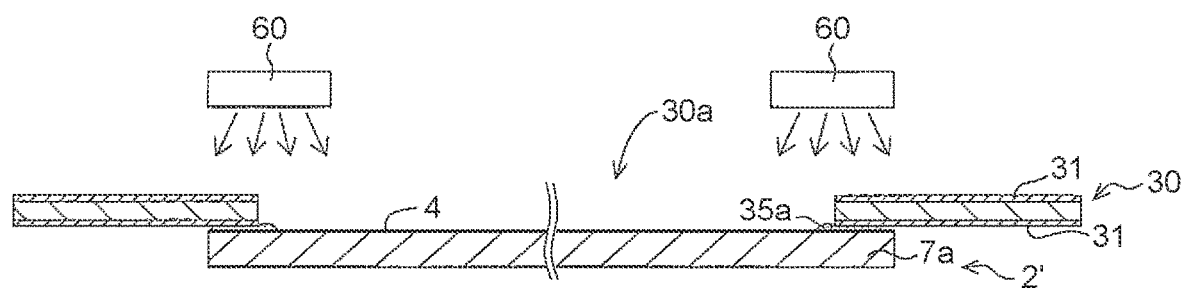
FIG. 9 is a view showing how a UV irradiation step of the single cell manufacturing method according to the embodiment of the present disclosure is performed.

In the UV irradiation step S5, as shown in FIG. 9, the adhesive 35a is irradiated with UV by UV irradiation devices 60 from above to cure the adhesive 35a and form the adhesive layer 35. Thus, the resin frame 30 and the MEA 4 of the AnMEGA 2' are fixed to each other through the adhesive layer 35. The resin frame 30 is configured to transmit UV light. The stacking step S4 and the UV irradiation step S5 are an example of the "second step" of the present disclosure.

Figure 10:
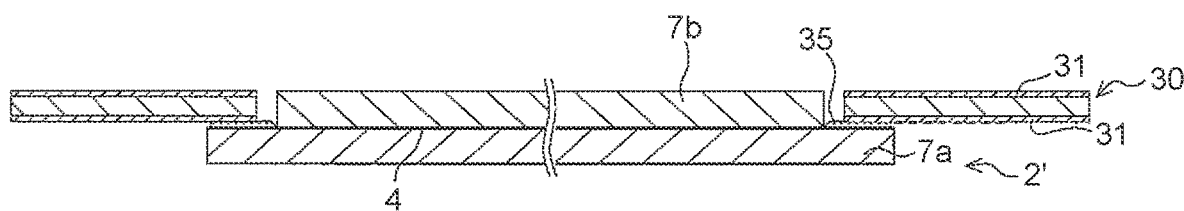
FIG. 10 is a view showing how an MEA formation step of the single cell manufacturing method according to the embodiment of the present disclosure is performed.

In the MEA formation step S6, as shown in FIG. 10, the cathode gas diffusion layer 7b is disposed inside the opening 30a of the resin frame 30 and brought into close contact with the cathode electrode 6b of the MEA 4. At this point, the peripheral edge portion of the cathode gas diffusion layer 7b comes into close contact with the adhesive layer 35 along the entire periphery. Therefore, the cathode electrode 6b of the MEA 4 is not exposed inside the opening 30a. The cathode gas diffusion layer 7b is retained at a predetermined position by tacking force of the adhesive layer 35.

In the thermo compression bonding step S7, the resin frame 30 is sandwiched between the pair of separators 3, and the separators 3 are joined to the resin frame 30 by thermo compression bonding using a die (not shown) having a built-in heating device. Thus, the separators 3 are bonded and fixed to the bonding layers 31 of the resin frame 30.

The single cell 1 is thus manufactured. The single cell 1 immediately after being manufactured cannot achieve good initial performance (output) because the solvent (organic solvent) contained in the adhesive layer 35 poisons the catalyst by being evaporated by heat during heat treatment in the thermo compression bonding step S7 etc. Therefore, a running-in operation (also called aging, conditioning, activation, etc.) is performed before shipment of the fuel cell, and the fuel cell is shipped after predetermined initial performance (output) can be achieved.

As described above, the manufacturing method according to the embodiment includes the adhesive application step S2 of applying the adhesive 35a by screen printing to the predetermined area of the resin frame 30 while fixing the resin frame 30 by suction. Thus, the object to be suctioned (resin frame 30) can be firmly fixed, unlike when the anode gas diffusion layer 7a provided on the MEA 4 and having a porous structure is suctioned. Therefore, even when the adhesive 35a having a lower solvent contact and hence higher viscosity is used, the object to be suctioned (resin frame 30) is less likely to stick to the screen printing plate 55 (i.e., to be lifted off the fixing base 50), and the single cell 1 can be easily manufactured.

Since the solvent content in the adhesive 35a can be reduced, the likelihood that the solvent may poison the catalyst by being evaporated by heat during manufacturing of the single cell 1 can be reduced. As a result, the solvent contained in the adhesive 35a is less likely to degrade the performance of the fuel cell, and the time required for a running-in operation before shipment of the fuel cell can be reduced.

Since the resin frame 30 is highly smooth, air bubbles are less likely to enter between the resin frame 30 and the adhesive 35a, and therefore the adhesive 35a need not be applied to a wide area with entry of many air bubbles taken into account. Thus, the single cell 1 can be downsized.

In the stacking step S4, bonding together the resin frame 30 and the MEA 4 while moving the resin frame 30 back and forth relatively to the MEA 4 in the planar directions of the resin frame 30 as described above can easily spread the adhesive 35a into the opening 30a.

Moreover, spreading the adhesive 35a into the opening 30a can reduce the likelihood that the cathode electrode 6b of the MEA 4 may be exposed inside the opening 30a. Since the cathode gas diffusion layer 7b disposed inside the opening 30a and the adhesive layer 35 can be brought into contact with each other, the cathode gas diffusion layer 7b can be retained by tacking force of the adhesive layer 35.

As described above, in the adhesive application step S2, the adhesive 35a is applied by screen printing in a state where the resin frame 30 is fixed by the fixing base 50 having the suction surface 50a to which the resin frame 30 is fixed by suction and the protrusion 50b that protrudes from the suction surface 50a into the opening 30a. This can reduce the likelihood that the screen printing plate 55 may be pressed into the opening 30a during screen printing on the resin frame 30, so that the adhesive 35a is less likely to be unevenly applied.

The embodiment disclosed herein should be regarded as in every respect merely illustrative and not restrictive. The scope of the present disclosure is defined not by the description of the above embodiment but by the claims, and includes all changes that are equivalent in meaning and scope to the claims.

For example, in the above embodiment, the example has been shown in which the gas diffusion layer provided on the side of the MEA 4 closer to the resin frame 30 is the cathode gas diffusion layer 7b and the gas diffusion layer provided on the opposite side from the resin frame 30 is the anode gas diffusion layer 7a. However, the present disclosure is not limited to this example. The gas diffusion layer provided on the side of the MEA 4 closer to the resin frame 30 may be the anode gas diffusion layer, and the gas diffusion layer provided on the opposite side from the resin frame 30 may be the cathode gas diffusion layer.

In the above embodiment, the example has been shown in which the resin frame 30 is fixed to the AnMEGA 2' and then the cathode gas diffusion layer 7b is disposed on the AnMEGA 2'. However, the present disclosure is not limited to this example. The cathode gas diffusion layer 7b may be disposed on the AnMEGA 2' to form the MEGA 2 and then the resin frame 30 may be fixed to the MEGA 2.

In the above embodiment, the example has been shown in which the resin frame 30 is turned upside down in the inverting step S3 and then the resin frame 30 is pressed against the AnMEGA 2' from above. However, the present disclosure is not limited to this example. The inverting step S3 may be omitted, and the AnMEGA 2' having been turned upside down from the state shown in FIG. 7 may be pressed against the resin frame 30 from above.

In the above embodiment, the example in which a UV-curing adhesive is used as the adhesive 35a has been shown. However, the present disclosure is not limited to this example, and various other types of adhesives than a UV-curing type can be used.

What is claimed is:

1. A manufacturing method of a fuel-cell single cell including a membrane-electrode assembly, gas diffusion layers disposed one on each surface of the membrane-electrode assembly, and a frame-shaped resin frame to which a peripheral edge portion of the membrane-electrode assembly is fixed, the method comprising:
    a first step of applying an adhesive by screen printing to a predetermined area of the resin frame while fixing the resin frame by suction; and
    a second step of bonding together by the adhesive the resin frame to which the adhesive has been applied and the membrane-electrode assembly that has the gas diffusion layer provided at least on a surface opposite from a surface to which the resin frame is to be bonded, wherein
    the resin frame has an opening bored through the resin frame in a thickness direction at a part surrounded by an area to which the adhesive is applied, and
    in the first step, the adhesive is applied by screen printing in a state where the resin frame is fixed by a fixing base having a suction surface to which the resin frame is fixed by suction and a protrusion that protrudes from the suction surface into the opening.

2. The manufacturing method of a fuel-cell single cell according to claim 1, wherein:

the resin frame has an opening bored through the resin frame in a thickness direction at a part surrounded by an area to which the adhesive is applied; and in the second step, the resin frame and the membrane-electrode assembly are bonded together while the resin frame and the membrane-electrode assembly are moved back and forth relatively to each other in planar directions orthogonal to the thickness direction such that the adhesive spreads into the opening.

\* \* \* \* \*